Patented Aug. 1, 1950

2,517,276

UNITED STATES PATENT OFFICE 2,517,276

PROCESS FOR THE PURIFICATION OF l-ASCORBIC ACID

Henry H. Bassford, Jr., and William S. Harmon, Elizabeth, N. J., assignors to Merck & Co., Inc., Rahway, N. J., a corporation of New Jersey No Drawing. Application May 16, 1945, Serial No. 594,170

3 Claims. (Cl. 202—42)

This invention relates generally to chemical processes and particularly to processes for recovering chemical compounds from aqueous solutions containing the same.

In the production of sorbose, aminothiazole, malic acid, l-ascorbic acid, sulfosalicylic acid, and many other substances, it has been common practice to isolate such substances by concentrating aqueous solutions thereof to cause crystallization, filtering out the crystals thus formed, and concentrating the mother liquors to obtain a series of crops of crystals. This mode of isolation, while used extensively for want of a better method, has numerous disadvantages; for example, distillation of the mother liquors usually results in discoloration and partial decomposition of the product; accumulation of impurities produces end-liquors containing substantial amounts of product not readily recoverable in crystalline form; there is considerable mechanical loss of product in the repeated handling of the mother liquors; filtration of the viscous slurries is very difficult; and it is also difficult to remove impurities from the product.

It is now discovered, according to the present invention, that essentially non-volatile solid substances can be isolated from aqueous solutions thereof in a substantially pure condition without resorting to the conventional practice of fractional crystallization and its inherent disadvantages; and further that substantially the entire amount of such substance contained in an aqueous solution can be recovered as a single crop of particled or crystalline material.

Regarded in certain of its broader aspects the process, according to the present invention, comprises admixing an aqueous solution of a substantially non-volatile solid chemical compound and a hydrophobic solvent which is a non-solvent for said compound, subjecting the mixture thus obtained to conditions of temperatuer and pressure such that an azeotropic mixture of said hydrophobic solvent and volatile components of said solution is distilled, continuing distillation until substantially all of the volatile components of said solution have been removed, thereby forming a suspension of said compound in the residual hydrophobic solvent, and recovering the compound from said suspension.

In isolating a substance, in accordance with the process of the present invention, an aqueous solution of an essentially non-volatile solid chemical compound is preferably first treated with a purifying agent such as charcoal and the charcoal and adsorbed impurities removed by filtration. The aqueous solution is then mixed with a suitable hydrophobic solvent and the mixture is heated either at atmospheric pressure or under vacuum to distill an azeotropic mixture of water and hydrophobic solvent. The distillation is continued until the water has been completely removed leaving an anhydrous slurry of the compound in finely particled or crystalline form in hydrophobic solvent. Depending upon the amount of solvent originally added and the rate at which it is distilled in the azeotropic mixture, it is sometimes advisable, or even necessary, to add more solvent during the distillation in order that sufficient solvent remains at the end of the distillation to form a free-filtering suspension or slurry of the product. The isolation of the compound is then completed by filtering off the hydrophobic solvent, washing the filter cake, and drying.

By the expression "hydrophobic solvent" is meant organic solvents which readily form two-phase systems with the aqueous solutions to be treated. Solvents which are wholly immiscible with the aqueous solution as well as solvents which are partially miscible therewith can be used. These hydrophobic solvents include hydrocarbons such as xylene, toluene, benzene, "Solvesso" (a petroleum fraction rich in toluene), and the like; chlorinated hydrocarbons such as tetrachlorethane, chlorbenzene, chloroform, ethylene dichloride, and the like; alcohols such as n-butyl alcohol, isobutyl alcohol, n-amyl alcohol, and isoamyl alcohol; and ketones such as methyl ethyl ketone, diethyl ketone, dipropyl ketone, and the like.

In selecting a solvent from the general class of hydrophobic solvents above defined which is "suitable" for isolating a particular compound from aqueous solution a number of factors are to be considered. The solvent must be essentially a non-solvent for said compound. It is to be noted, however, that in some instances crystal or particle formation is facilitated and more readily controlled when the solvent is one in which the compound is very slightly soluble rather than wholly insoluble. The solvent should also be one which is a solvent for impurities and colored materials known to be associated with the compound in aqueous solution. It should be noted, in this connection, that mixtures of hydrophobic solvents can be used to obtain desired conditions of minimum solubility of the compound and maximum solubility of associated impurities and colored materials therein. Thus, mixtures such as xylene-isoamyl alcohol, toluene-isobutyl alcohol, tetrachlorethane-isobutyl alcohol, and the like can be employed.

Aqueous solutions to be treated by the process of the present invention may be prepared by dissolving a compound in crude or impure form in water. In many instances, however, an aqueous solution of a crude or impure product results from previous chemical operations and it will be apparent that such solutions can be treated by the present process without the necessity of performing any intermediate operations except the possible charcoal treatment above mentioned to remove readily adsorbed and filtrable impurities. When an aqueous solution of either type is admixed with hydrophobic solvent and subjected to azeotropic distillation in the manner described substantially all of the compound in solution is recovered as a single crop of crystalline or particled material freed from at least part of the impurities associated therewith in said solution. The degree of purification obtained will, of course, depend upon the particular compound being isolated, the impurities that were associated with such compound, and the solvent or solvent mixture employed in the azeotropic distillation, and in some instances the product obtained by the present process can be obtained in a form sufficiently pure to be used without further purification.

When pharmaceutical compounds or reagent chemicals which must meet exceptionally high standards of purity are to be prepared, it is generally advisable to effect the final purification by crystallizing a first crop of pure material in the conventional manner. By then treating the first crop mother liquor by the process of the present invention instead or by the conventional method of successive concentrations and fractional crystallization a markedly higher percentage of the residual compound in said mother liquor is recovered at a great saving in time, labor, and equipment and, as recovered, the compound is in condition for direct recovery of additional pure product.

The effectiveness of our process in retarding decomposition and discoloration of product when recovering the same from mother liquors is clearly illustrated by Example V wherein comparative tests show recovery of pure l-ascorbic acid by the present azeotropic process to be about 93-95% whereas the recovery by the conventional process is only about 85-86%. This favorable result may be explained as follows: (1) The boiling point of the azeotropic mixture is below the boiling point of an aqueous solution for any given pressure of distillation; (2) the aqueous solution is dispersed throughout the hydrophobic solvent in the form of droplets and the heat required for vaporization of the water is conducted to the droplets by the hydrophobic solvent, thereby avoiding local superheating of the aqueous solution in a liquid film in contact with the still wall; (3) as the compound is thrown from the aqueous solution upon removal of the water it is suspended in the hydrophobic solvent in a finely particled or crystalline form thus avoiding caking and charring which frequently accompanies straight evaporation of aqueous solutions beyond the saturated stage.

It should be noted that while in the process herein described a constant boiling mixture of water and solvent, and hence a true "azeotropic" mixture will be distilled during a portion of the distillation, the equilibrium conditions may not prevail during the entire distillation, and mixtures of varying composition and varying boiling point may distill during a portion of the distillation by what may properly be termed solvent vapor distillation. As used throughout the specification it will be understood that the true azeotropic distillation and this solvent vapor distillation are both embraced within the expressions "azeotropic distillation" and "azeotropic mixture."

The following examples illustrate methods of carrying out the present invention, but it is to be understood that these examples are given by way of illustration and not of limitation.

EXAMPLE I

About 105 g. of crude vitamin C, assaying 95% pure, is dissolved in 140 cc. of distilled water and about 5 g. of charcoal is added. The mixture is stirred for about one hour at 60° C. and the charcoal is then filtered from the hot solution. The resulting liquor is charged, together with an equal volume of toluene, to a distillation apparatus and heated under 27 inches of vacuum to distill an azeotropic mixture of water and toluene. Distillation is continued, while adding toluene to replace that distilled, until all of the water has been thus removed (about 800 cc. of toluene being required). The resulting slurry of vitamin C in toluene is cooled to 15° C., filtered, and the filter cake washed with two 50 cc. portions of isoamyl alcohol, then with ether and dried. The recovered vitamin C (l-ascorbic acid) is almost white and assays 99.8% pure.

EXAMPLE II

About 100 g. of crude sulfosalicylic acid (3-carboxy-4-hydroxy-benzene sulfonic acid), prepared by the sulfonation of salicylic acid, and which has been previously treated to remove substantially all of the sulfuric acid therefrom, is dissolved in about 40 cc. of distilled water at 80° C. and filtered to remove dirt and other impurities. It is preferable not to use charcoal to remove impurities because the liquor is quite syrupy and it is difficult to filter charcoal therefrom. The filtrate is cooled, with agitation, to crystallize sulfosalicylic acid dihydrate. The crystalline dihydrate is filtered off, washed carefully with a fine spray of water (about 10 cc. is sufficient) and the product is dried at a temperature below 50° C. About 55 g. of dry reagent grade sulfosalicylic acid dehydrate is thus obtained.

The mother liquor and washings from this first crop is mixed with about 60 cc. of xylene and heated under vacuum to distill an azeotropic mixture of water and xylene. Distillation is continued until the water is completely removed leaving a suspension of crude sulfosalicylic acid in xylene. The suspension is filtered, and the filter cake washed and dried. The crude sulfosalicylic acid thus recovered is in a form suitable for adding to a subsequent batch for final purification.

EXAMPLE III

A solution of d-sorbitol is fermented under the combined action of air and *Acetobacter suboxydans*, according to conventional methods, to convert d-sorbitol to l-sorbose, and the culture medium is purified by treating with charcoal and filtering. A portion of the filtered medium, which by analysis contains approximately 100 g. of l-sorbose, is partially concentrated under vacuum to reduce the volume of solution to about 350 cc.

This solution is mixed with about 300 cc. of benzene and heated at atmospheric pressure to distill an azeotropic mixture of benzene and water. Distillation is continued, with addition of benzene to maintain the volume of distilland above about 300 cc., until all the water is removed, leaving a slurry of crystalline l-sorbose in benzene. The slurry is then filtered, the filter cake is washed with acetone to remove colored impurities and then dried. Approximately 95 g. of nearly pure crystalline l-sorbose is thus recovered.

By way of comparison, in recovering l-sorbose by conventional methods, an l-sorbose solution is vacuum concentrated to about 65-75% strength and cooled to crystallize a first crop of crystalline material which is recovered by filtration. The mother liquor is concentrated in like manner to yield a second crop of crystalline l-sorbose, and the second crop mother liquor likewise treated to give a third crop. The third crop mother liquor is usually so syrupy and caramelized that no additional crystalline material can be obtained therefrom. Recoveries by this process have varied commercially from 60 to 75% of the l-sorbose originally present in the starting solution.

EXAMPLE IV

Aminothiazole is prepared by condensing monochloracetaldehyde with thiourea in aqueous solution, according to conventional methods, and acidic materials liberated are neutralized and the pH is adjusted to about 8.5. (When the neutralized solution is cooled to crystallize aminothiazole, according to conventional methods, only part of the aminothiazole is recovered and that is contaminated with impurities such as the saline neutralization products. The mother liquid is difficult to treat by usual methods to recover additional aminothiazole.)

A portion of neutralized solution containing by analysis approximately 100 g. of aminothiazole is extracted in a column with a counter current of 400 cc. of ethylene dichloride, and the extract is run to a second column where the ethylene dichloride is steam distilled and an aqueous solution of aminothiazole is formed. The aqueous solution is then mixed with an equal volume (about 300 cc.) of xylene and heated to distill an azeotropic mixture of water and xylene. Distillation is continued while adding xylene to replace that distilled (about 800 cc. being required) until all the water has been removed, leaving a slurry of crystalline aminothiazole in xylene. The slurry is then filtered and the filter cake washed free of xylene with petroleum ether, and dried. Approximately 96 g. of nearly pure aminothiazole is thus recovered (96% recovery based upon aminothiazole content of the starting neutralized solution).

EXAMPLE V

A comparison is made in the laboratory, under conditions approximating as nearly as possible those which prevail in commercial equipment, between recovery of pure l-ascorbic acid by the process of the present invention (Experiment A) and by a conventional process (Experiment B) starting with materials having a known l-ascorbic acid content.

*Experiment A*

A quantity of crude l-ascorbic acid containing 100 g. of pure l-ascorbic acid by analysis is dissolved at about 60° C. in 140 cc. of water, treated with 5 g. of charcoal while hot to remove colored impurities, and filtered. The filtrate is cooled overnight to crystallize a first crop of pure l-ascorbic acid which is recovered by filtration. Approximately 65.7 g. of pure l-ascorbic acid is recovered. The mother liquor is mixed with about 140 cc. of tetrachlorethane and heated under vacuum to distill an azeotropic mixture of water and tetrachlorethane. Distillation is continued while adding tetrachlorethane to maintain a substantially constant volume of distilland until all of the water is distilled leaving a slurry of crystalline l-ascorbic acid in tetrachlorethane. The slurry is cooled, filtered, and the filter cake washed with isopropyl alcohol to remove colored impurities, then with ether, and dried. The first crop recovered crude thus obtained contains (by assay) about 34.0 g. of pure l-ascorbic acid.

This recovered crude is dissolved in about 48 cc. (1.4 parts by weight) of water at 60° C., treated with charcoal, filtered, and crystallized as above described giving, as a second crop pure, approximately 18.4 g. of l-ascorbic acid. By azeotropic distillation with tetrachlorethane in the manner described the second crop mother liquor yields a second crop of crude assaying about 13.9 g. of pure l-ascorbic acid. The process is repeated to give, as a third crop pure, approximately 7.2 g. of l-ascorbic acid and a third crop crude containing about 5.3 g. of pure l-ascorbic acid.

At this point about 91.3 g. (of the original 100 g.) of pure l-ascorbic acid has been recovered, 5.3 g. of pure is available in the third crop crude for further processing to give additional pure product, and only about 3.4 g. or 3.4% of the l-ascorbic acid originally present has been lost through decomposition or in other ways.

*Experiment B*

(In this experiment in order to insure optimum conditions and to avoid losses which might be due at least in part to impurities originally present in a crude starting material pure vitamin C has been used as the starting material. Losses which result in the process are therefore due essentially to decomposition of product which is inherent in various steps of the process; and the recovery of pure product is the maximum that can be expected in commercial operations according to this process.)

Approximately 100 g. of pure l-ascorbic acid is dissolved in water at 60° C. and the solution is cooled overnight. The first crop of crystalline l-ascorbic acid thus formed is recovered by filtration, and dried. It weighs approximately 64.2 g. The mother liquor is evaporated under vacuum at 40-45° C. until crystallization from the hot solution commences. The concentrate is then cooled overnight during which time about half of the l-ascorbic acid in the mother liquor crystallizes. (Attempts to concentrate further and thus to recover a greater percentage of the residual product in the mother liquor cause caramelization making it difficult to obtain additional pure product from the recovered crude.) Upon filtering off the mother liquor (which is saved) a first crop crude assaying about 16.7 g. of pure l-ascorbic acid is obtained. This is dissolved in about 24 cc. (1.4 parts by weight) of water at 60° C. and the solution cooled overnight to crystallize a second crop of pure which is recovered by filtration and weighs about 10.3 g.

The mother liquors from the first crop crude and second crop pure are combined, evaporated under vacuum at 40-45° C. until crystallization begins and then cooled overnight. Upon filtration a second crop crude containing approximately 11.8 g. of pure l-ascorbic acid is recovered, and the filtrate is again saved.

When the second crop crude is processed in the manner described, approximately 8.6 g. of l-ascorbic acid is obtained as third crop pure; and processing the combined mother liquors from the third crop pure and second crop crude gives a third crop crude which by assay contains about 5.9 g. of pure l-ascorbic acid. At this point approximately 83.1 g. of pure and 5.9 g. in the third crop crude, or a total of 89 g. of l-ascorbic acid is accounted for and 11 g. (11%) of the original starting material has been decomposed, or is in the now almost unworkable mother liquors.

The third crop crude and the residual mother liquors can be worked up to give 2-3 g. of additional pure product, but beyond that the crude residues become so dark and tarry that further recovery of pure product therefrom is almost impossible.

The total recovery of pure l-ascorbic acid by this process is therefore about 85-86 g. (85-86%). As pure l-ascorbic acid is used as the starting material, it is apparent that between 14 and 15% has been lost essentially due to decomposition and caramelization during the vacuum concentration of mother liquors.

As recovery of additional pure product from the third crop crude in Experiment A will be at least as good as in Experiment B, viz., at least 2-3 g., it is apparent that recovery of pure l-ascorbic acid by the process of Experiment A is about 93-95 g. (93-95%), and that not more than 5-6% of the l-ascorbic acid originally present is lost due to decomposition.

Comparative results of Experiments A and B are set forth in the table.

TABLE

| | Item | Experiment A | Experiment B |
|---|---|---|---|
| | | Per cent | Per cent |
| 1 | Total recoverable pure l-ascorbic acid | 93-95 | 85-86 |
| 2 | l-Ascorbic acid in first crop crude | 34.0 | 16.7 |
| 3 | l-Ascorbic acid lost and remaining in mother liquor from first crop crude | 0.3 | 19.1 |
| 4 | Total recovered pure in two crops (substantially equal labor) | 84.1 | 74.5 |
| 5 | Loss resulting from decomposition | 5-7 | 14-15 |

In the table the results obtained in Experiment A and Experiment B are summarized: item 1 compares the overall yields which can be expected in commercial operation of the two processes; item 2 shows the pure content of the crude material obtainable from the first mother liquor; item 3 compares the amounts lost and remaining in the mother liquor following crystallization of the first crop recovered crude therefrom; item 4 shows the actual pure obtainable in two crops, including that originally isolated and that recovered by purification of the recovered crude in item 2; item 5 compares the losses inherent in the two processes.

It will be seen that the total pure obtainable by the azeotropic process (Experiment A) is 7 to 10% higher than is possible by the conventional process. Not only is it possible to obtain a greater overall recovery by the process of Experiment A but initial recoveries beginning with the second crop are also approximately 9 to 10% higher due to the large amount of material remaining in the mother liquor after crystallization of each crop of recovered crude in the process of Experiment B.

EXAMPLE VI

A solution of 100 g. of vitamin C in 140 cc. of water at 60° C. is mixed with 500 cc. of methyl ethyl ketone whereupon two layers form. The mixture is distilled azeotropically at atmospheric pressure and, as the water is removed from the distilland, l-ascorbic acid separates in crystalline form. Methyl ethyl ketone is added during the distillation to control the volume of distilland so that it progressively decreases until, when approximately 1500 cc. of distillate has been collected, practically all the water is removed, leaving as the residual distilland, a slurry of l-ascorbic acid in approximately 100 cc. of 90% methyl ethyl ketone. This slurry is then cooled to about 10° C. and stirred to crystallize the l-ascorbic acid which is then filtered, washed with 2×10 cc. of 90% methyl ethyl ketone at 10° C., and dried. The yield of dried product is 96 g. As methyl ethyl ketone is a good solvent for the impurities usually present in crude vitamin C, the l-ascorbic acid crystallizes as a pure white material, colored matters remaining in the mother liquor.

EXAMPLE VII

About 30 g. of l-ascorbic acid is dissolved in 30 cc. of hot water, 30 cc. of isobutyl alcohol is added and the mixture distilled azeotropically at 27 inches vacuum. Isobutyl alcohol is added during distillation to maintain a substantially constant volume of distilland and, as water is removed from the distilland, l-ascorbic acid separates in crystalline form. When the water is completely removed practically all of the l-ascorbic acid is suspended as a crystalline slurry in the essentially anhydrous isobutyl alcohol. The solubility of l-ascorbic acid in isobutyl alcohol is about 3% warm and 1% cold; this solubility is sufficient so that the l-ascorbic acid crystallizing during the distillation forms a free-filtering slurry without any tendency to cake on the sides of the distilling vessel. The slurry is cooled to crystallize the small amount of l-ascorbic acid remaining in the hot isobutyl alcohol liquor, the cold slurry is filtered and the isobutyl alcohol washed therefrom with ether. The cake is then dried to produce 28 g. of almost pure white vitamin C; recovery approximately 94%.

Modifications may be made in carrying out the present invention without departing from the spirit and scope thereof, and the invention is to be limited only by the appended claims.

What is claimed is:

1. In a process for purifying l-ascorbic acid by crystallizing from aqueous solution a first crop of pure l-ascorbic acid and filtering off the mother liquor containing residual l-ascorbic acid and organic impurities, the steps that comprise admixing said mother liquor with a hydrophobic solvent which is a non-solvent for l-ascorbic acid and a solvent for impurities known to be associated therewith, said solvent being selected from the class consisting of aromatic hydrocarbons, chlorinated hydrocarbons, aliphatic alcohols containing 4 to 5 carbon atoms and ketones, heating the mixture thus obtained under vacuum to distill a mixture of water and solvent, continuing distillation until substantially all of the water has been removed, thereby forming a suspension of crystals of l-ascorbic acid in residual hydrophobic solvent containing dissolved organic impurities, filtering off the solvent, preparing an aqueous solution of the crude l-ascorbic acid thus obtained, crystallizing therefrom a further crop of pure l-ascorbic acid, filtering off the mother liquor and repeating said steps until substantially all of the l-ascorbic acid has been recovered in pure crystalline form.

2. In a process for purifying l-ascorbic acid by crystallizing from aqueous solution a first crop of pure l-ascorbic acid and filtering off the mother liquor containing residual l-ascorbic acid and organic impurities, the steps that comprise admixing said mother liquor with tetrachlorethane, heating the mixture thus obtained under vacuum to distill a mixture of water and tetrachlorethane, continuing distillation until substantially all of the water has been removed, thereby forming a suspension of crystals of l-ascorbic acid in tetrachlorethane containing dissolved organic impurities, filtering off the tetrachlorethane, preparing an aqueous solution of the crude l-ascorbic acid thus obtained, crystallizing therefrom a further crop of pure l-ascorbic acid, filtering off the mother liquor, and repeating said steps until substantially all of the l-ascorbic acid has been recovered in pure crystalline form.

3. In a process for purifying l-ascorbic acid by crystallizing from aqueous solution a first crop of pure l-ascorbic acid and filtering off the mother liquor containing residual l-ascorbic acid and organic impurities, the steps that comprise admixing said mother liquor with an aliphatic alcohol containing 4 to 5 carbon atoms, heating the mixture thus obtained under vacuum to distill a mixture of water and alcohol, continuing distillation until substantially all of the water has been removed, thereby forming a suspension of crystals of l-ascorbic acid in alcohol containing dissolved organic impurities, filtering off the alcohol, preparing an aqueous solution of the crude l-ascorbic acid thus obtained, crystallizing therefrom a further crop of pure l-ascorbic acid, filtering off the mother liquor, and repeating said steps until substantially all of the l-ascorbic acid has been recovered in pure crystalline form.

HENRY H. BASSFORD, Jr.
WILLIAM S. HARMON.

REFERENCES CITED

The following references are of record in the file of this patent:

UNITED STATES PATENTS

| Number | Name | Date |
|---|---|---|
| 1,549,885 | Littman | Aug. 18, 1925 |
| 1,791,906 | Savage | Feb. 10, 1931 |
| 1,934,667 | Ash | Nov. 14, 1933 |
| 1,989,541 | Blanchod | Jan. 22, 1935 |
| 2,058,435 | Fisher | Oct. 27, 1936 |
| 2,138,048 | Vesce | Nov. 29, 1938 |
| 2,144,654 | Guthman | Jan. 24, 1939 |
| 2,152,716 | Van Wirt et al. | Apr. 4, 1939 |
| 2,264,759 | Jones | Dec. 2, 1941 |
| 2,305,106 | Pratt | Dec. 15, 1942 |
| 2,326,099 | Kokatnur | Aug. 3, 1943 |
| 2,360,186 | Wyler | Oct. 10, 1944 |

OTHER REFERENCES

Industrial and Engineering Chemistry, Sept. 1941, vol. 33, No. 9, page 1109. Copy in U. S. Patent Office, Scientific Library, Washington, D. C.